United States Patent [19]
Michel

[11] 3,715,074
[45] Feb. 6, 1973

[54] STANDABLE BAG MADE FROM FLEXIBLE FILM MATERIAL

[75] Inventor: Wolfgang Michel, Wiesbaden-Biebrich, Germany

[73] Assignee: Kalle Aktiengesellschaft, Wiesbaden-Biebrich, Germany

[22] Filed: Feb. 23, 1971

[21] Appl. No.: 118,106

[30] Foreign Application Priority Data

Feb. 25, 1970 Germany..................P 20 08 780.3

[52] U.S. Cl. ....................229/57, 150/50, 128/272
[51] Int. Cl. ..............................................B65d 33/00
[58] Field of Search ..............221/55, 56, 57; 150/50; 128/272; 93/35

[56] References Cited

UNITED STATES PATENTS

| | | | |
|---|---|---|---|
| 3,437,258 | 4/1969 | Kugler | 229/57 X |
| 3,438,567 | 4/1969 | Bell, Jr. | 229/57 |
| 3,211,144 | 10/1965 | Nehring | 128/272 X |

*Primary Examiner*—Davis T. Moorhead
*Attorney*—James E. Bryan

[57] ABSTRACT

This invention relates to a bag-like container made from a single piece of flexible film and a process for making the same, the container comprising two lateral surfaces, an inwardly domed bottom adjacent the lower ends of said surfaces, and sealed seams between two layers of film laterally limiting the bag and extending over the entire bag length.

17 Claims, 3 Drawing Figures

PATENTED FEB 6 1973  3,715,074

INVENTOR
WOLFGANG MICHEL

BY James E. Bryan
ATTORNEY

STANDABLE BAG MADE FROM FLEXIBLE FILM MATERIAL

The present invention relates to a bag-like container capable of standing up in the filled state and which is made in one piece from flexible film having at least one heat-sealable surface.

Standable bags consisting of two plastic films are known in which the bottom and the wall are firmly united with one another by welding or sealing. Bags of this kind have the disadvantage that they have zones of at least four superposed layers of film united with one another by welding. These zones are within the lateral seams of the bag and the seam zones of the bag represent critical zones regarding the filling density of the bag. Particularly upon mechanical stress by shock or impact of the filled and closed bag, the poor adhesive bond of the film layers with respect to one another is often so greatly stressed in the seam zones that the bag breaks and the filling escapes.

The present invention provides a bag of flexible weldable film material which is capable of standing up in the filled state and does not have the disadvantages of the known standable two-component bags of plastic film.

The novel bag-like container is made of flexible film having at least one surface of a heat-sealable plastic material. The container includes two lateral surfaces and, adjacent the lower ends thereof, an inwardly domed bottom and welding or sealing seams laterally limiting the bag and extending over the entire bag length. The bag is made in one piece and the welded seams thereof form a bond between two layers of film.

In the following, the designation "sheet" means a self-supporting sheet consisting of one flexible ply of heat-sealable plastic material as well as a sheet of a film laminate consisting of superposed plies firmly united with one another, which laminate has at least one heat-sealable outer surface.

The "zone of the film bond" means that zone of the bag within which the bag consists of two superposed layers of film firmly united with one another.

The bag of the invention, which is capable of standing up in the filled state, may be made of any sufficiently flexible and sufficiently rigid film as long as the film has at least one heat-sealable surface.

Suitable films are, particularly, thermoplastic synthetic films of polyvinyl acetate, polyethylene, polyamide, and copolymers of vinyl chloride, more particularly however of polyvinyl chloride.

Particularly advantageously, the bag consists of a sufficiently flexible, sufficiently rigid film laminate of at least two superposed plies firmly united with one another, at least one surface of the laminate being heat-sealable.

The heat-sealable surface of the laminate preferably is a thermoplastic synthetic material.

Particularly preferred laminates of the above-mentioned kind are of a polyamide film carrying on one surface a firmly adhering sealable layer of polyethylene. Another preferred laminate is formed by an aluminum foil having on one surface thereof a firmly adhering layer of polyethylene.

The bag of the invention, which is capable of standing up in the filled state, is made in one piece. It is formed from a sheet having a dome protruding from the plane thereof. The sheet with the dome may be formed from a planar rectangular sheet of defined dimensions in known manner by thermoforming.

When using a sheet of a laminate of an aluminum foil and a polyethylene layer for the production of the bag of the invention, the sheet has a cut-out in the aluminum foil in that zone in which the dome is formed by deep-drawing, which cut-out has a shape substantially corresponding to the base of the dome to be shaped.

According to a preferred method, a film web is continuously provided by thermoforming, over its entire length, with a plurality of equally dimensioned domes equally spaced from one another and from the web edges. The film web is then separated in known manner by punching into a plurality of equally dimensioned sheets each of which has a dome.

The sheet from which the bag of the invention is formed has a rectangular shape, preferably the shape of a rectangle with two parallel longer edges and two shorter lateral edges. The shorter axis of symmetry of the preferred sheet is the center line perpendicular to the longer lateral edge of the sheet and the longer axis of symmetry correspondingly is the center line which forms a right angle with the shorter lateral edge of the sheet.

The shorter axis of symmetry simultaneously is that line about which the two equally long lateral parts of the sheet are bent toward one another during the fabrication of the bag.

The dome preferably has an elliptical base or a base corresponding to a scalene rectangle with rounded-off corners. The preferred dome thus has a base with a shorter and a longer axis of symmetry.

The dome is formed in such a manner in the plane of the sheet that the point of intersection of the axes of symmetry thereof corresponds to the point of intersection of the axes of symmetry of the sheet.

The invention also relates to a process for the production of the above-described standable bag of flexible film material.

The process for the production of the standable bag of flexible film material is performed in such a manner that a dome is formed in a planar rectangular sheet of flexible film having at least one heat-sealable surface such that the point of intersection of the axes of symmetry of the dome base, which are perpendicular to one another, is identical with the point of intersection of the axes of symmetry of the sheet, which are perpendicular to one another. The content-contacting surface of the dome is heat-sealable, and the sheet provided with the dome is bent about the axis of symmetry thereof until the lateral parts of the sheet are superposed, their edge zones are flush with one another, and the contents-contacting surfaces of the lateral parts of the sheet are facing one another and the contents-contacting surface of the dome. The lateral parts of the sheet are then united in the lateral edge zones thereof to form a firm seam-like bond of two layers of film so that there is no connection between the contents-contacting surface of the bottom fold and the inside edges of the zones of the film bond.

The process of the invention preferably is performed in a manner such that a sheet in the shape of a scalene rectangle is used, the dome base of which similarly has the shape of a scalene rectangle, the longer lateral edge of this rectangle being parallel to the shorter lateral edge of the sheet. During the process, the sheet is then bent in the described manner about the shorter axis of symmetry of the sheet.

The process of the invention is performed particularly advantageously with a sheet the dome of which has a base of a shape corresponding to a scalene rectangle with rounded-off corners.

In another preferred embodiment of the process, a sheet is used the dome of which has an elliptical base.

In the process of the invention, the dome in the sheet preferably is made by thermoforming.

According to the novel process, uniting the superposed lateral parts of the sheet to form a firm bond of two layers of film representing the lateral seams of the bag preferably is performed by welding or heat-sealing.

It is particularly advantageous to perform the process according to the invention with a sheet of polyvinyl chloride film. Particularly advantageous also is the use of a sheet of a laminate of a polyamide film having on one surface a firmly adhering layer of polyethylene.

For performing the process, it is also possible to use a sheet of a laminate of an aluminum foil and a polyethylene layer on one surface thereof. In this case, it is necessary, however, that the sheet of the laminate consist only of a polyethylene layer in that zone of the sheet surface which is provided as the base of the dome.

The process is performed with a sheet having a thickness in the range of 50 to 500$\mu$, particularly in the range of 100 to 200$\mu$, more particularly with a sheet of a thickness of 120$\mu$.

The production of the bag of the invention which is capable of standing up in the filled state will be further described by way of a planar sheet in the form of a scalene rectangle.

The height of the bag corresponds to half of the sheet length and the bag width to the width of the sheet.

By means of a molding tool of suitable dimensions, a dome is formed in the sheet according to the thermoforming process. The base of the dome is arranged symmetrically within the sheet surface and the planar parts of equal dimensions remaining in the sheet by the symmetrical arrangement are designated as lateral parts.

The surfaces of the lateral parts adjacent the edge of the base of the dome are designated as the inside surfaces thereof and, correspondingly to this designation, the surfaces opposite to the inside surfaces of the two lateral parts are designated as the outside surfaces.

The surface of the dome adjacent the base edge of the dome is the lower surface of the dome and the surface on which the bag stands when the bag formed from the sheet is used in the filled state for the intended purpose; the other surface of the dome is the upper surface, which is in contact with the contents of the filled bag.

For the purpose of shaping a bag, the sheet with the dome is bent about its shorter center line or the longer axis of symmetry of the dome base in a manner such that the inside surfaces of the lateral parts are moved toward one another and the upper surface of the dome faces the inside surfaces of the sheet. Then, the flush lateral edges of the superposed lateral parts of the sheet are firmly united with one another over their entire length by welding or sealing, the resulting edge sealing seams of the bag forming a bond of two layers of film over their entire length.

The bag has an inlet opening opposite to the bottom of the bag. The bag filled with liquid, solid or pasty mass may be closed by sealing the edges of the inlet opening of the bag.

In a particular embodiment of the bag of the invention, one or both lateral surfaces surrounding the contents-receiving space of the bag may extend in the longitudinal direction of the bag over the closure seam forming the bag opening. The film ends formed above the closure seam of the bag opening of one or both lateral walls of the bag may be provided with perforations for suspension of the filled bag. When the mass is filled through the opening into the container, the pressure effect on the inside surface of the dome which first protrudes into the interior of the bag is pressed outwardly, due to the flexibility of the film material, to such an extent that it forms a surface on which the bag stands. By means of this surface the filled film bag can stand securely on a support.

The construction of the bag-like container of the invention which has an inwardly extending bottom fold in the form of a dome in the sheet, the surface of which has no connection with the inside lateral edge of the lateral welding seam of the bag, provides a standable film bag with welded seams of only two layers of film. The distance between the inside edge of the longitudinal sealing seam or welding seam of the bag from the surface of the dome should at least correspond to the width of the sealing seam.

The bag of the invention also may be formed from a flat bag in the bottom of which the dome is formed in known manner by thermoforming. This method requires a bag-receiving mandrel and a corresponding shaping punch.

The invention will be further illustrated by reference to the accompanying drawings. The drawings do not represent a limitation of the invention to the illustrated preferred embodiment.

Figure 1:
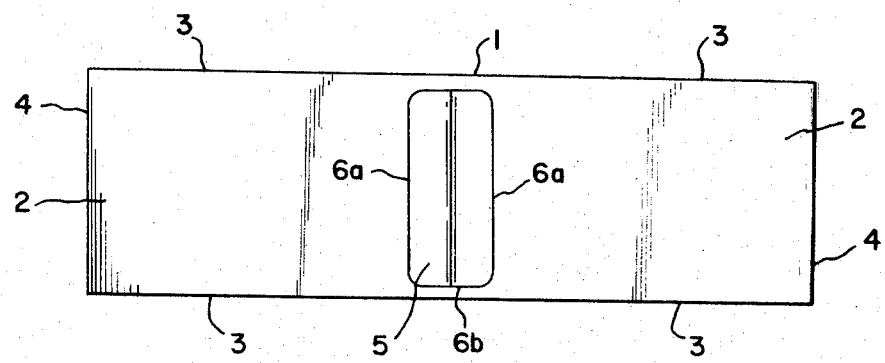
FIG. 1 is a plan view of a rectangular sheet with the base of the dome.

In FIG. 1, numeral 1 designates the sheet of a rectangular shape as a whole, numeral 2 designates the equally long and equally wide lateral parts in one piece, numeral 3 designates the longitudinal edge of the lateral part, numeral 4 designates the lateral edge thereof, and numeral 5 designates the base of the dome. The base of the dome is surrounded by two parallel equally long edges which are longer than two similarly parallel edges perpendicular to the first-mentioned edges. The longer edges of the dome base are designated 6a and the shorter ones 6b. The longer edges 6a of the dome base are parallel to the shorter lateral edges of the sheet; the shorter edges 6b of the dome base are parallel to the lateral edges 3 of the sheet.

The distance of a shorter lateral edge 4 of a lateral part from the corresponding longer base edge 6a of the dome is the same as that of the other shorter lateral edge 4 from the corresponding base edge 6a of the dome.

Figure 2:
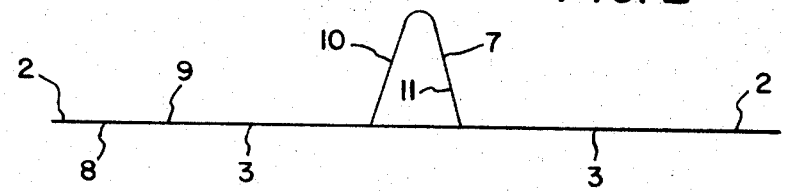
FIG. 2 is a longitudinal side elevation of a sheet with the dome protruding from the sheet plane.

In FIG. 2, numerals 2 and 3 have the same meanings as in FIG. 1. Numeral 7 designates the dome formed out of the plane of the sheet, numeral 8 designates the outside surface of the lateral part of the sheet and numeral 9 designates the inside surface thereof. Numeral 10 designates the upper surface of the dome and numeral 11 designates the lower surface of the dome.

Figure 3:
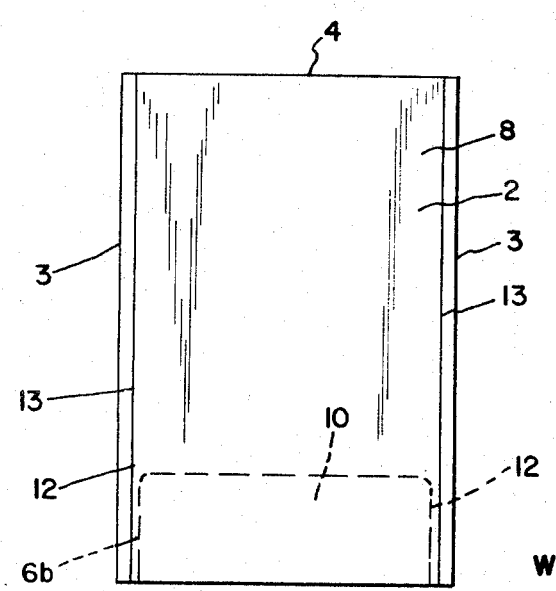
FIG. 3 is a plan view of the bag of the invention in the collapsed form.

In FIG. 3, numerals 2, 3, 4, 6b, and 10 have the same meanings as in FIGS. 1 and 2. Numeral 13 designates a longitudinal welding seam of the bag, within which the superposed lateral parts are firmly united to form a bond of two layers of film. Numeral 12 designates a zone of the lateral wall of the bag, which consists of one layer and is between the inside edge of the two-layer welding seam 13 and the surface extending into the interior of the bag.

When using a film laminate as the sheet, which has only one outside sealable surface, this surface must form the inside surface of the lateral parts.

The dome is symmetrical. When bending the sheet as described, a symmetrically domed bottom is obtained in the bag.

The shortest distance of the inside edge of each welding seam of the bag from the surface of the bottom protruding into the interior of the bag should at least correspond to the width of the welding seam.

It will be obvious to those skilled in the art that many modifications may be made within the scope of the present invention without departing from the spirit thereof, and the invention includes all such modifications.

What is claimed is:

1. A bag-like container, made from a single piece of flexible film, comprising two lateral surfaces, an inwardly domed bottom adjacent the lower ends of said surfaces, and only two sealed seams between only two layers of film laterally limiting the bag and extending over the entire bag length.

2. A container according to claim 1 in which the bottom dome is symmetrical.

3. A container according to claim 1 in which the shortest distance of the inside edge of each lateral sealed seam of the bag from the upper surface of the bottom dome corresponds at least to the width of the sealed seam.

4. A container according to claim 1 fabricated from polyvinyl chloride film.

5. A container according to claim 1 fabricated from a film laminate.

6. A container according to claim 5 in which the laminate is of polyamide film and polyethylene.

7. A container according to claim 5 in which the laminate is of aluminum foil and polyethylene.

8. A process for the production of a bag-like container which comprises:

forming a dome in a planar sheet of flexible film having at least one heat-sealable surface in a manner such that the point of intersection of the axes of symmetry of the dome base, which are perpendicular to one another, coincides with the point of intersection of the axes of symmetry of the sheet, which are perpendicular to one another, and the contents-contacting surface of the dome is heat-sealable, bending the sheet about the axis of symmetry thereof until the lateral parts of the sheet are superposed, the edge zones thereof are flush with one another, and the contents-contacting surfaces of the lateral parts of the sheet face one another and the contents-contacting surface of the dome, and bonding only the lateral parts of the sheet in the lateral edge zones thereof to form a firm seam-like bond of only two layers of film so that there is no connection between the contents-contacting surface of the bottom and the inside edges of the zones of the film bond.

9. A process according to claim 8 in which the dome base has the shape of a scalene rectangle with rounded-off corners, the longer lateral edge of the dome base is parallel to the shorter lateral edge of the sheet, the sheet is bent about the shorter axis of symmetry thereof, and the lateral parts of the sheet are united with one another in the zone of the lateral edges thereof.

10. A process according to claim 8 in which the dome has an elliptical base.

11. A process according to claim 8 in which the dome is formed by thermoforming the sheet.

12. A process according to claim 8 in which the bond of two layers of film is formed by sealing the lateral zones of the superposed lateral parts of the sheet.

13. A process according to claim 8 in which the sheet is a film of polyvinyl chloride.

14. A process according to claim 8 in which the sheet is a laminate of polyamide film and polyethylene.

15. A process according to claim 8 in which the sheet has a thickness in the range of 50 to 500$\mu$.

16. A process according to claim 8 in which the sheet has a thickness in the range of 100 to 200$\mu$.

17. A process according to claim 8 in which the sheet has a thickness of 120$\mu$.

* * * * *